May 7, 1968  R. C. McKINLAY  3,381,651

FLUID FILTER ASSEMBLY HAVING A WARNING INDICATOR

Filed May 31, 1967

ROBERT C. McKINLAY
INVENTOR

BY John R. Faulkner
C. Dennis O'Connor
ATTORNEYS

United States Patent Office 3,381,651
Patented May 7, 1968

3,381,651
FLUID FILTER ASSEMBLY HAVING A WARNING INDICATOR
Robert C. McKinlay, Dearborn, Mich., assignor to Ford Motor Company, Dearborn, Mich., a corporation of Delaware
Filed May 31, 1967, Ser. No. 642,397
5 Claims. (Cl. 116—70)

ABSTRACT OF THE DISCLOSURE

A fluid filter assembly including filtering material through which the fluid to be filtered passes and an indicator warning of dirt contamination of the filter to the extent that filtering efficiency is impaired. A visual signal is given by the indicator when a significant pressure drop across the filtering material is sensed by the indicator as occurs when the filtering material becomes clogged with dirt.

Background of the invention

It is well known to filter the fluid such as ambient air that is mixed with fuel to form the charge for an internal combustion engine. This filtering avoids the introduction of dirt and other harmful contaminants in both the charge forming device of the engine and the engine proper. Conventionally, a filter assembly is mounted on the air horn of the engine charge forming device. The filter assembly is thus in direct communication with the engine intake manifold and manifold vacuum draws air through the filter assembly. Also, the intake scoop of the filter assembly is so oriented that the air rushing into the engine compartment when the vehicle is moving enters the filter assembly. The engine fan also aids the entry of air into the filter assembly. Within the filter assembly is a continuous length of porous filter material constructed so as to allow the passage of air therethrough while filtering out dirt and other contaminants present in the air. After a period of use, this filtering material becomes clogged with dirt and the passage of air therethrough is greatly restricted. This condition prevents free breathing of the engine and greatly impairs engine operating efficiency.

Periodic maintenance must, therefore, be done to promote continued acceptable air filtering. This maintenance consists of either cleaning or replacing the filter material, depending on the particular type of filter material used.

Investigation has shown that fluid filter maintenance is oft times neglected by the vehicle owner or the attending mechanic. This neglect and the corresponding clogging of the filter material lead to the entry of contaminants into the engine charge forming device and the engine itself, a decrease in engine vehicle gas mileage, a loss of power and a general deterioration of engine operating efficiency. On the other hand, fluid filters often become covered with dirt although there is no actual impairment of filter efficiency. Replacement of the filter or other maintenance at such a time is needless and incurs added maintenance expense.

This invention provides a fluid filter assembly that may be used in conjunction with an internal combustion engine, said assembly including a warning indicator that positively indicates, upon a visual inspection thereof, the need for maintenance of the fluid filter, and in particular the filtering material. Following the required maintenance, the indicator conveniently may be reset to show that no maintenance is required until such time as filter operating efficiency again is impaired.

Summary of the invention

A fluid filter assembly constructed in accordance with this invention includes an outer shell surrounding a member constructed of filtering material through which fluid passes. The shell and the member define an enclosure. A warning indicator comprising a housing having a central chamber is secured to the shell and extends through an aperture in the shell so that a partially transparent first portion of the housing is exterior of the shell and a second portion of the housing extends into the enclosure. A flexible, impervious diaphragm is secured to the housing and divides the housing chamber into a first chamber portion partially defined by the first housing portion and a second chamber portion partially defined by the second housing portion. A brightly colored visual warning means is secured within the first chamber portion so as to be visible through the transparent area of housing surface. A first orifice extends through the housing and communicates between the first chamber portion and the atmosphere and a second orifice through the housing communicates between the second chamber portion and the enclosure. Opaque covering means are secured to the diaphragm for movement therewith and normally cover the warning means so the latter are not observable. Upon pressure in the first chamber portion becoming significantly greater than pressure in the second chamber portion, the covering means moves with the diaphragm and the warning means is uncovered and can be observed through the transparent area of the indicator housing.

Detailed description of the invention

Figure 1:
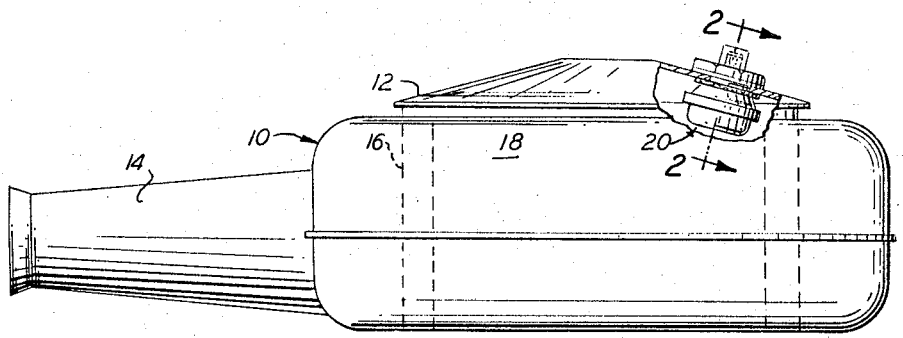
FIGURE 1 is a side elevation view of a fluid filter assembly constructed in accordance with this invention, having parts broken away to show the warning indicator and illustrating schematically the filtering member.

Referring now in detail to the drawings, the numeral 10 indicates generally a fluid filter assembly adapted for use in combination with an internal combustion engine and having an outer casing or shell 12 and an air scoop 14. Surrounded by outer shell 12 is a continuous length of porous filtering material 16 that defines, with shell 12, an enclosure 18 through which filtered air passes to the engine charge forming device.

A warning indicator, identified by the reference numeral 20, is secured to shell 12 as will be described in detail below. Indicator 20 has a composite outer housing including elements 22, 30 and 36. Element 22 is generally frustroconical and has a portion 24 of cylindrical cross section at its upper extremity. External threads 26 are formed on cylindrical portion 24. A radially extending flange 28 projects from the lower extremity of element 22. A plurality of apertures 29 extend through the wall of element 22 along a portion of the length of threads 26. Housing element 30 is generally bell-shaped and has an aperture 32 extending therethrough and a hooked projection 34 engaging flange 28 of element 22. Housing element 36 is formed from a transparent material such as acrylic plastic and is secured to the inside wall of cylindrical portion 24 of element 22. A finger shaped warning member 38, preferably formed from brightly colored material, extends through a hole 40 in element 36 and is held against movement due to an integrally formed shoulder 42 extending therefrom.

It readily may be appreciated that the three housing elements 22, 30 and 36 comprise a composite housing defining a central housing chamber. A flexible, impervious diaphragm 44 is mounted between elements 22 and 30 and divides the housing chamber into an upper chamber portion 46 and a lower chamber portion 48.

Figure 2:
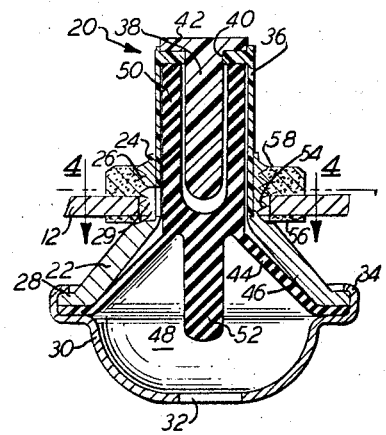
FIGURE 2 is an enlarged sectional view taken along the line 2—2 of FIGURE 1 illustrating the warning indicator in its normal position.
Figure 3:
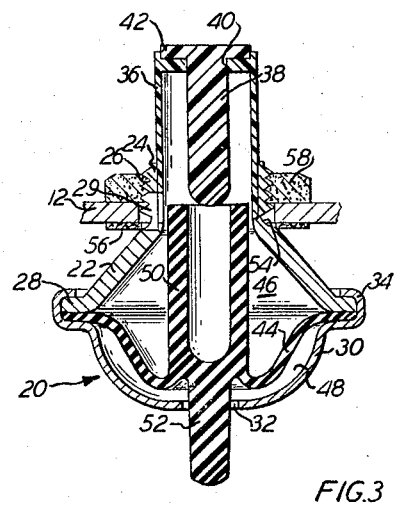
FIGURE 3 is a view similar to FIGURE 2 but illustrating the warning indicator in the warning position.
Figure 4:
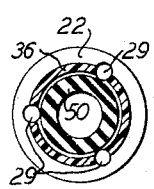
FIGURE 4 is a sectional view through the warning indicator housing taken along the line 4—4 of FIGURE 2.

An opaque cup or sleeve 50 is formed integrally with diaphragm 44 and extends into chamber portion 46 so as to surround and cover warning member 38 when diaphragm 44 is in the position illustrated in FIGURE 2 and is remote from warning member 38 when diaphragm 44 is in the position illustrated in FIGURE 3. An integrally formed reset projection 52 extends from diaphragm 44 into chamber portion 48 and registers with aperture 32 formed through housing element 30.

Warning indicator 20 extends through a hole 54 formed through shell 12 so that threads 26 are exterior of enclosure 18. A resilient washer 56 is positioned about the housing between the conical portion of element 22 and shell 12 to prevent pressure leakage between apertures 29 and enclosure 18. A nut 58 cooperates with threads 26 to securely mount the indicator 20 in the position illustrated.

Nut 58 is formed from porous material such as sintered bronze powder or sintered stainless steel powder. A porosity of from 30 to 50 percent for nut 58 has been found to be acceptable for purposes of this invention. This porosity of nut 58 allows the presence of atmospheric pressure in housing chamber portion 46 as direct communication exists between this chamber portion and the atmosphere through apertures 29 and nut 58. Also, nut 58 acts as a filter preventing the entry of dirt into chamber portion 46.

The operation of this device is as follows. When the filtering material of member 16 is clean, air passing through air scoop 14 passes easily through member 16 and into enclosure 18 so that the pressure drop through member 16, if indeed a pressure drop exists, is infinitesimal. In most instances, the fact that air is being forced through air scoop 14 tends to raise the pressure in enclosure 18 above atmospheric pressure. Since chamber portion 48 is in direct communication with enclosure 18 via aperture 42, the pressure present in enclosure 18 also is present in chamber portion 48. As explained above, this pressure is equal to or greater than the atmospheric pressure in chamber portion 46.

Diaphragm 44 normally is in the position illustrated in FIGURE 2 with sleeve 50 covering from view the warning member 38. The conical shape of diaphragm 44 tends to maintain the diaphragm in this position against the force of gravity. As long as member 16 remains clean and the pressure in chamber 48 is equal to or greater than atmospheric pressure, diaphragm 44 does not move.

As filtering member 16 becomes dirty, however, and air flow therethrough is impaired, a pressure drop occurs across member 16. Since enclosure 18 is in direct communication with the engine charge forming device and intake manifold vacuum, the pressure in enclosure 18 and chamber portion 48 becomes less than atmospheric pressure. When the pressure drop becomes sufficiently great to impair filtering efficiency and engine operation, the force of the atmospheric pressure present in chamber portion 46 acts on diaphragm 44 and overcomes the resistance of the diaphragm to movement, forcing the diaphragm into the position illustrated in FIGURE 3. Warning member 38 then may be observed through transparent housing element 38 and a visual inspection of the warning indicator 20 notifies the observer that maintenance is required.

As may be observed from FIGURE 3, when diaphragm 44 is in the warning position, projection 52 extends through aperture 32. After the performance of the required maintenance, the diaphragm 44 conveniently may be reset manually by pushing projection 52 upward. The conical shape of the diaphragm will cause it to assume and remain in its original position.

It thus may be seen that this invention provides a fluid filter assembly including a warning indicator that gives notice, upon a visual inspection thereof, of the need for filter maintenance whenever the filter member becomes sufficiently clogged with dirt that the resulting impediment to fluid flow deleteriously affects engine operation.

It is to be understood that this invention is not limited to the exact construction illustrated and described above, but that various changes and modifications may be made without departing from the spirit and scope of the invention as defined by the following claims.

I claim:
1. In a fluid assembly having an outer shell surrounding a filtering member through which fluid passes, said shell and said filtering member defining an enclosure and said shell having an aperture therethrough: a warning indicator device comprising a housing having a central chamber, said housing secured to said shell and extending through said aperture so that a partially transparent first portion of said housing is exterior of said shell and a second portion of said housing is within said enclosure, a flexible impervious diaphragmatic member secured to said housing and dividing said chamber into a first chamber portion partially defined by said first housing portion and a second chamber portion partially defined by said second housing portion, visual warning means secured within said first chamber portion, said housing having a first orifice therethrough communicating between said first chamber portion and the atmosphere and a second orifice therethrough communicating between said second chamber portion and said enclosure, and opaque covering means secured to said diaphragmatic member for movement therewith in response to a pressure differential between said chamber portions from a position surrounding said warning means to a position remote from said warning means, said first housing portion having external threads formed thereon, a nut having threads engaging said housing threads and securing said housing to said shell, said first orifice extending through a threaded area of said housing, said nut being formed from porous material to admit atmospheric pressure through said first orifice to said first chamber portion.

2. Apparatus according to claim 1, wherein said nut is formed from sintered powdered metal.

3. Apparatus according to claim 1, wherein said nut has a porosity of from 30 to 50 percent.

4. In a fluid filter assembly having an outer shell surrounding a filter member through which fluid passes, said shell and said filtering member defining an enclosure and said shell having an opening therethrough, a warning indicator device including a housing having an interior chamber and external threads, said housing positioned in said shell opening and having a first portion within said enclosure and a second portion constructed in part of transparent material exterior of said enclosure, threaded fastener means exterior of said enclosure formed from porous material and cooperating with said housing threads to secure said housing to said shell, a flexible diaphragm secured to said housing and dividing said chamber into a first chamber portion partially defined by said first housing portion and a second chamber portion partially defined by said second chamber portion, visual warning means secured to said housing in said second chamber portion proximate said transparent material, said first housing portion having a first aperture therethrough communicating between said first chamber portion and said enclosure, said second housing portion having a second aperture therethrough registering with said porous fastener means and admitting atmospheric pressure to said second chamber portion, and opaque covering means secured to said diaphragm for movement therewith in response to a pressure differential between said chamber portions from a position surrounding said warning means to a position remote from said warning means.

5. Apparatus according to claim 4, wherein said threaded fastener means is a nut formed from sintered powdered metal.

References Cited

UNITED STATES PATENTS

| | | | |
|---|---|---|---|
| 1,610,452 | 12/1926 | Kennedy | 73—146.8 XR |
| 2,850,900 | 9/1958 | Billington | 73—406 |
| 2,903,888 | 9/1959 | Gfoll | 73—146.8 |
| 3,129,689 | 4/1964 | Henderson et al. | 116—34 |
| 3,312,187 | 4/1967 | McKinlay | 116—70 |

FOREIGN PATENTS 217,789　10/1961　Austria.

LOUIS J. CAPOZI, *Primary Examiner.*